(12) United States Patent
Yoo et al.

(10) Patent No.: US 11,860,101 B2
(45) Date of Patent: Jan. 2, 2024

(54) MULTI-PHOTON MICROSCOPY AND IMAGING METHOD, LOWERING REPETITION RATE TO USE TIME-GATED DETECTION

(71) Applicant: KOREA ADVANCED INSTITUTE OF SCIENCE AND TECHNOLOGY, Daejeon (KR)

(72) Inventors: Hongki Yoo, Daejeon (KR); Wooseop Kim, Daejeon (KR); Juehyung Kang, Daejeon (KR); Ungyo Kang, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 67 days.

(21) Appl. No.: 17/583,658

(22) Filed: Jan. 25, 2022

(65) Prior Publication Data

US 2022/0146427 A1    May 12, 2022

Related U.S. Application Data

(63) Continuation of application No. PCT/KR2021/001434, filed on Feb. 3, 2021.

(30) Foreign Application Priority Data

Apr. 17, 2020  (KR) .................. 10-2020-0046708

(51) Int. Cl.
*G01N 21/64* (2006.01)
*G02B 21/00* (2006.01)
(Continued)

(52) U.S. Cl.
CPC ..... *G01N 21/6458* (2013.01); *G01N 21/6428* (2013.01); *G02B 21/002* (2013.01); *G02B 21/04* (2013.01); *G02B 21/16* (2013.01)

(58) Field of Classification Search
CPC .......... G01N 21/6458; G01N 21/6428; G02B 21/002; G02B 21/04; G02B 21/16;
(Continued)

(56) References Cited

U.S. PATENT DOCUMENTS

| | | | |
|---|---|---|---|
| 2003/0011765 A1* | 1/2003 | Xie | ................ G01N 21/65 356/301 |
| 2007/0199927 A1* | 8/2007 | Gu | ............... B23K 26/0626 219/121.69 |
| 2008/0100834 A1 | 5/2008 | Kung et al. | |

FOREIGN PATENT DOCUMENTS

| | | |
|---|---|---|
| EP | 1424678 | 6/2004 |
| JP | 2008-216996 | 9/2008 |

(Continued)

OTHER PUBLICATIONS

Kriti Charan et al. "Fiber-based tunable repetition rate source for deep tissue two-photon fluorescence microscopy." Biomedical optics express 9.5 (2018): 2304-2311, May 2018.
(Continued)

*Primary Examiner* — Que Tan Le
*Assistant Examiner* — Mai Thi Ngoc Tran
(74) *Attorney, Agent, or Firm* — LEX IP MEISTER, PLLC

(57) ABSTRACT

The multi-photon microscope comprises a repetition rate tuner that lowers an optical pulse train emitted from a pulsed laser to a repetition rate for time-gated detection, a scanner that scans the optical pulse train transmitted from the repetition rate tuner in x-axis and y-axis directions, an objective lens that irradiates an optical signal scanned by the scanner to the sample and acquires a fluorescence signal emitted from the excited fluorescent material, a photodetector that photoelectrically converts the fluorescence signal acquired by the objective lens, an amplifier that converts a current signal output from the photodetector into a voltage
(Continued)

signal, a digitizer that samples the voltage signal output from the amplifier, and a computing device that separates sampling data output from the digitizer with a detection window set in time domain, and generates an image based on the sampling data separated by the detection window.

10 Claims, 13 Drawing Sheets

(51) Int. Cl.
*G02B 21/04* (2006.01)
*G02B 21/16* (2006.01)
(58) Field of Classification Search
CPC ............ G02B 21/0064; G02B 21/0076; G02B 21/008; G02B 21/0084
USPC ....................................................... 250/201.1
See application file for complete search history.

(56) References Cited

FOREIGN PATENT DOCUMENTS

| | | |
|---|---|---|
| JP | 2010-008082 | 1/2010 |
| KR | 10-2011-0112347 | 10/2011 |
| KR | 20120111023 | 10/2012 |
| KR | 10-2016-0014340 | 2/2016 |
| WO | 2018159272 | 2/2020 |

OTHER PUBLICATIONS

Vini Gautam et al. "Improved two-photon imaging of living neurons in brain tissue through temporal gating." Biomedical optics express 6.10 (2015): 4027-4036, Sep. 2015.

Ivan Coto Hernandez et al. "Two-photon excitation STED microscopy with time-gated detection." Scientific reports 6 (2016): 19419, Jan. 2016.

Jiheun Ryu et al. "Real-time visualization of two-photon fluorescence lifetime imaging microscopy using a wavelength-tunable femtosecond pulsed laser." Biomedical optics express 9.7 (2018): 3449-3463, Jul. 2018.

Yuankang Lu et al. "Catheter-based time-gated near-infrared fluorescence/OCT imaging system." Diagnostic and Therapeutic Applications of Light in Cardiology 2018. vol. 10471. International Society for Optics and Photonics, Feb. 2018.

Y. Le Grand et al. "Non-descanned versus descanned epifluorescence collection in two-photon microscopy: Experiments and Monte Carlo simulations." Optics Communications 281.21 (2008): 5480-5486, Nov. 2008.

Winfried Denk, James H. Strickler, and Watt W. Webb. "Two-photon laser scanning fluorescence microscopy." Science 248.4951 (1990): 73-76., Apr. 1990.

Youngjae Won et al., "High-speed confocal fluorescence lifetime imaging microscopy (FLIM) with the analog mean delay (AMD) method." Optics express 19.4 (2011): 3396-3405, Feb. 2011.

Juehyung Kang et al., "Label-free multimodal microscopy using a single light source and detector for biological imaging", Optics Letters, vol. 46, No. 4 , Feb. 2021.

Juehyung Kang et al., "Labe-free nonlinear microscopy with single source and detector", Biophotonics Congress: Optics in the Life Sciences 2021, Apr. 2021.

Juehyung Kang et al., "Single source and detector multimodal nonlinear microscope for biological imaging", Korean Society of Medical & Biological Engineering Spring conference 2021 'Frontiers in Digital Healthcare' on May 12-14, 2021.

KIPO, PCT Search Report & Written Opinion of Application No. PCT/KR2021/001434, dated May 11, 2021.

* cited by examiner

MULTI-PHOTON MICROSCOPY AND IMAGING METHOD, LOWERING REPETITION RATE TO USE TIME-GATED DETECTION

CROSS-REFERENCE TO RELATED APPLICATION

This application claims priority to and the benefit of Korean Patent Application No. 10-2020-0046708 filed in the Korean Intellectual Property Office on Apr. 17, 2020, and PCT/KR2021/001434 filed on Feb. 3, 2021, the entire contents of which are incorporated herein by reference.

BACKGROUND

(a) Field

The present invention relates to a multi-photon microscope.

(b) Description of the Related Art

A multi-photon microscope excites a fluorescent material using multi-photon excitation. Here, the multi-photon microscope excites an energy level of a ground state to an intermediate energy level with a photon having a low energy, and then excites the intermediate energy level to a final energy level with a next photon. Then, the multi-photon microscope acquires a light emitted from the excited fluorescent material and performs imaging using the acquired light. This multi-photon microscope has the merit of enabling deep tissue imaging with higher resolution and causing less tissue damage than a single-photon microscope.

Multi-photon excitation efficiency is proportional to the square (two photons) or the cube (three photons) of a light intensity. Therefore, the multi-photon microscope requires high peak power and usually uses a pulsed laser having a pulse width of 100 fs. Meanwhile, the peak power is inversely proportional to a repetition rate of the pulsed laser at the same output power. Thus, a conventional multi-photon microscope using a pulsed laser with a high repetition rate (e.g., 76-100 MHz) has a limitation on the peak power.

Since the multi-photon microscope uses a light with a longer wavelength than a general fluorescence microscope, it has a high tissue transmittance and can perform high quality imaging in a deep area of a sample. However, since the conventional multi-photon microscope requires a technique (e.g., frame averaging) to increase a signal to noise ratio (SNR), it has a drawback in that the image acquisition time is lengthened. In addition, since the conventional multi-photon microscope continuously detects the light emitted from the fluorescent material, the SNR is lowered by a background signal.

SUMMARY

The present invention provides a multi-photon microscope to which a repetition rate tuning of a pulsed laser and time-gated detection are applied, and an imaging method thereof.

According to an embodiment, a multi-photon microscope exciting a fluorescent material in a sample using multi-photon excitation is provided. The multi-photon microscope comprises a repetition rate tuner that lowers an optical pulse train output from a pulsed laser to a repetition rate for time-gated detection, a scanner that scans the optical pulse train transmitted from the repetition rate tuner in x-axis and y-axis directions, an objective lens that irradiates an optical signal scanned by the scanner to the sample and acquires a fluorescence signal emitted from the excited fluorescent material, a photodetector that photoelectrically converts the fluorescence signal acquired by the objective lens, an amplifier that converts a current signal output from the photodetector into a voltage signal, a digitizer that samples the voltage signal output from the amplifier, and a computing device that separates sampling data output from the digitizer with a detection window set in time domain, and generates an image based on the sampling data separated by the detection window.

The repetition rate tuner may be a pulse picker or a cavity dumper.

The computing device may set a plurality of candidate detection windows in time domain, compare signal to noise ratios (SNRs) of fluorescence signals measured by each of the candidate detection windows, and determine the detection window.

The computing device may generate an image from sampling data separated by the detection window, based on the repetition rate set by the repetition rate tuner, sampling information of the digitizer, and scanning information of the scanner.

The photodetector may receive the fluorescence signal reflected by a dichroic mirror located between the repetition rate tuner and the scanner, or the fluorescence signal reflected by a dichroic mirror located between the objective lens and the scanner.

The photodetector may receive fluorescence signals of different wavelengths separated by wavelength at different times.

The photodetector and the amplifier may be constructed wavelength-specifically for the fluorescence signal.

According to another embodiment, an operation method of a multi-photon microscope exciting a fluorescent material in a sample using multi-photon excitation is provided. The method comprises lowering an optical pulse train output from a pulsed laser to a repetition rate for time-gated detection, irradiating the optical pulse train of the repetition rate to the sample, generating sampling data by detecting a fluorescence signal emitted from the fluorescent material in the sample at specific time intervals, separating a signal using a detection window set in time domain from the sampling data, and generating an image using the sampling data separated with the detection window. The operation method may further comprise setting a plurality of candidate detection windows in time domain, comparing SNRs of fluorescence signals measured by each of the candidate detection windows, and determining a candidate detection window having an optimal SNR among the plurality of the candidate detection windows as the detection window.

Generating the image may comprise generating the image from the sampling data, based on the repetition rate, sampling information for generating the sampling data, and scanning information of a scanner.

According to still another embodiment, an operation method of a two-photon microscope is provided. The operation method comprises converting a light emitted from a fluorescent material in a sample into an electrical signal, and setting a detection window in time domain, and generating an image using sampling data of the electrical signal detected in time domain of the detection window. The fluorescent material in the sample is excited through multiphoton excitation by an optical pulse train having a repetition rate related to the detection window, and then emits the fluorescence signal.

According to an embodiment, imaging performance can be improved by increasing a peak power and improving a SNR through repetition rate tuning of a pulsed laser and time-gated detection.

According to an embodiment, an intensity of a fluorescence signal acquired by a multi-photon microscope can be greatly improved by lowering a repetition rate of a pulsed laser, under a condition that an average power of a light irradiated to a sample is limited to a certain value in consideration of sample damage. In addition, according to an embodiment, it is possible to reduce an average power of a light irradiated to a sample by lowering a repetition rate of a pulsed laser, thereby reducing sample damage.

According to an embodiment, a signal to noise ratio (SNR) can be improved by removing a background signal through time-gated detection.

DETAILED DESCRIPTION OF THE EMBODIMENTS

Figure 1:
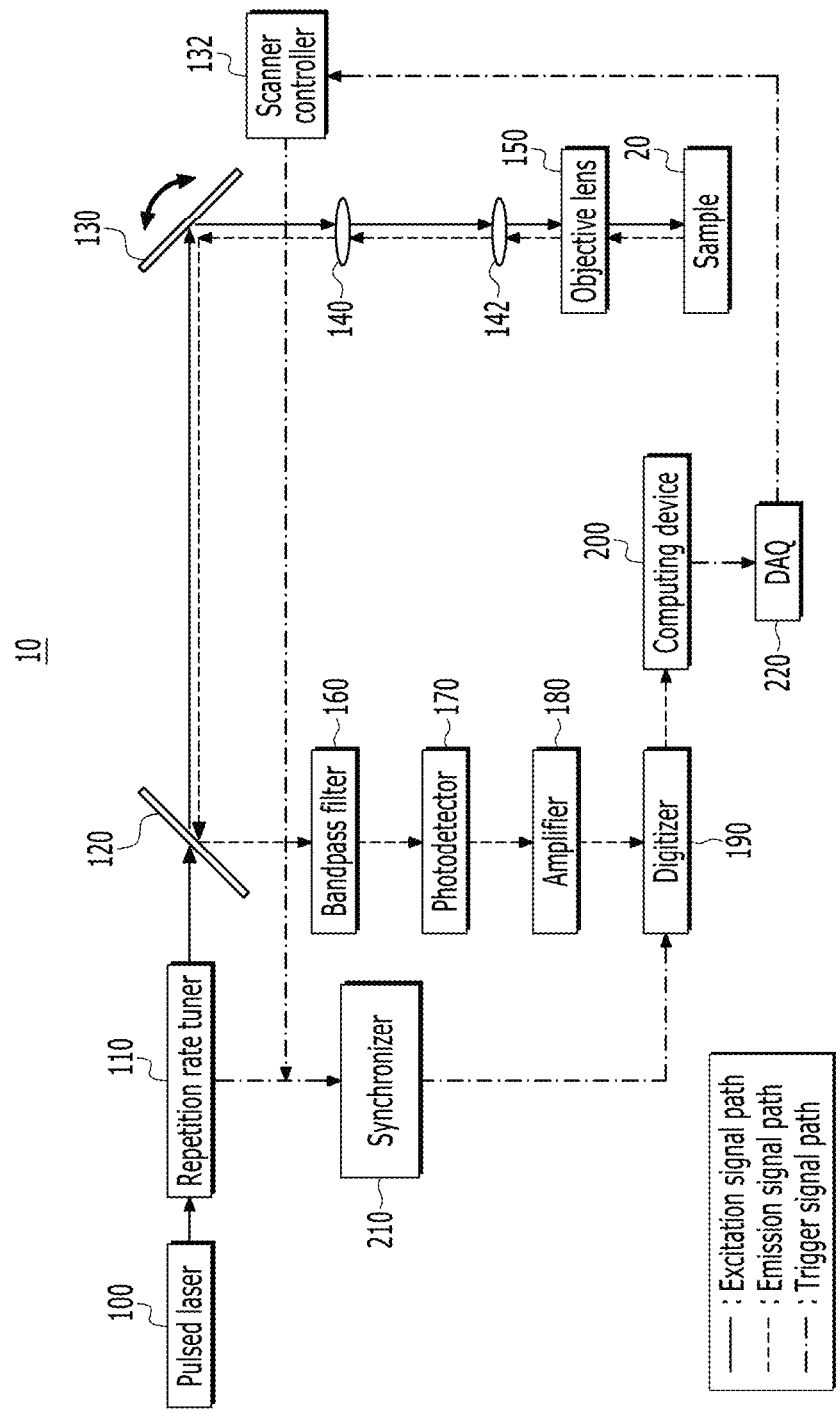
FIG. 1 is a configuration diagram of a multi-photon microscope according to an embodiment.

Hereinafter, embodiments of the present invention will be described in detail with reference to the attached drawings so that the person of ordinary skill in the art may easily implement the present invention. However, the present invention may be modified in various ways and is not limited to the embodiments described herein. In the drawings, elements irrelevant to the description of the present invention are omitted for simplicity of explanation, and like reference numerals designate like elements throughout the specification.

In the description, when a part is referred to "include" a certain element, it means that it may further include other elements rather than exclude other elements, unless specifically indicates otherwise. In the description, the terms such as " . . . unit", " . . . er/or", " . . . module", and the like refer to units that process at least one function or operation, which may be implemented with a hardware, a software or a combination thereof.

In the description, it is explained that the repetition rate of a pulsed laser is varied by a separate device. However, if the repetition rate is varied in the pulsed laser, a repetition rate tuner may not be used.

Figure 2:
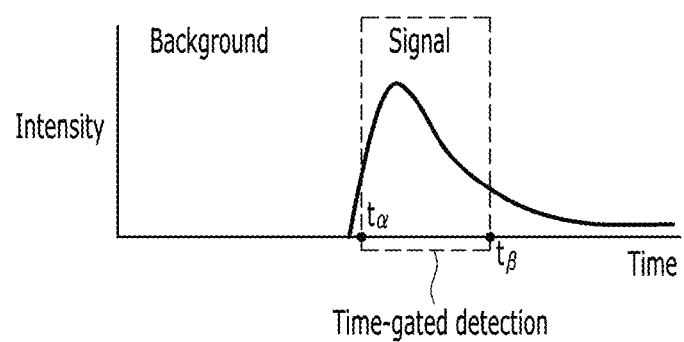
FIG. 2 is a diagram illustrating the concept of time-gated detection according to an embodiment.

FIG. 1 is a configuration diagram of a multi-photon microscope according to an embodiment and FIG. 2 is a diagram illustrating the concept of time-gated detection according to an embodiment.

Referring to FIG. 1, a multi-photon microscope 10 excites a fluorescent material of a sample 20 using multi-photon excitation. Then, the multi-photon microscope 10 acquires a light (fluorescence signal) emitted from the excited fluorescent material, and performs imaging using the acquired light. In the drawings including FIG. 1, a path of a signal transmitted from a pulsed laser 100 for the excitation of the fluorescent material in the sample 20 is represented as an excitation signal path, a path of the fluorescence signal emitted from the sample 20 is represented as an emission signal path, and a path of a signal for controlling among devices is represented as a trigger signal path, respectively.

The elements constituting the excitation signal path from the pulsed laser 100 to an objective lens 150 and the emission signal path from the objective lens 150 to a digitizer 190 in the multi-photon microscope 10 may be diversely changed. For example, the multi-photon microscope 10 may include the pulsed laser 100, a repetition rate tuner 110, a dichroic mirror 120, a scanner 130, a scanner controller 132, scan lenses 140 and 142, the objective lens 150, a bandpass filter 160, a photodetector 170, an amplifier 180, a digitizer 190, and a computing device 200. The photodetector 170 may be a photomultiplier tube (PMT).

The multiphoton microscope 10 may further include a synchronizer 210 providing synchronization information required for sampling by the digitizer 190, and a data collector (data acquisition, DAQ) 220.

The synchronizer 210 can communicate with the repetition rate tuner 110 and the scanner controller 132, and can transmit the repetition rate varied by the repetition rate tuner 110 and scanning information controlled by the scanner controller 132 to the digitizer 190. The data collector 220 can receive various data from the computing device 200 and, can transmit the control signal to the scanner controller 132 if necessary.

The pulsed laser 100 is a light source and emits an optical pulse train with a specific wavelength. The repetition rate of the pulsed laser 100 can be diverse, but the repetition rate is assumed to be 76 MHz in the description. The repetition rate is a reciprocal number of a time interval (period) between pulses.

The repetition rate tuner 110 changes the optical pulse train emitted from the pulsed laser 100 to have a low repetition rate. For example, the repetition rate tuner 110 changes the repetition rate of the pulsed laser 100 from 76 MHz to 4 MHz. That is, the repetition rate tuner 110 increases the time interval between optical pulses in order to secure a signal distance for time-gated detection. At the same average power, a peak power is changed when the repetition rate of the optical pulse is changed in the repetition rate tuner 110. The repetition rate and the peak power have an inversely proportional relation. The repetition rate tuner 110 may be implemented with a pulse picker, a cavity dumper, and the like.

The optical pulse train with the changed repetition rate passes through the dichroic mirror 120, is scanned in the x-axis and y-axis directions by the scanner 130, passes through the scan lenses 140 and 142 and the objective lens 150, and then is irradiated to the sample 20 to be measured. The dichroic mirror 120 has the characteristic of reflecting a light of a specific wavelength band and making a light of the remaining wavelength band pass. It is assumed that the dichroic mirror 120 makes an optical pulse from the pulsed laser 100, being an excitation signal, pass through and reflects the fluorescence signal emitted from the sample 20. The scanner 130 is an optical device that quickly changes the direction of a laser beam, and may be implemented with a Galvano mirror, a resonant mirror, a polygon mirror, an acousto-optic deflector, and the like.

The fluorescent material of the sample 20 is excited through multi-photon excitation and emits a light (optical signal) corresponding to the absorbed energy. In the description, the emitted light is referred to as a fluorescence emission light or simply a fluorescence signal.

The fluorescence signal reaches the dichroic mirror 12 after passing through a path of the objective lens 150, the scan lenses 142 and 140, and the scanner 130. The fluorescence signal reflected from the dichroic mirror 120 passes through the bandpass filter 160 and then is converted into a current signal through photoelectric conversion in the photodetector 170. The current signal is converted into a voltage signal in the amplifier 180.

The digitizer 190 outputs sampling data obtained through digitization of a signal (voltage signal) input from the amplifier 180 by certain time intervals. The digitizer 190 is driven by at least one processor, and the processor executes a program to perform an operation of the present invention.

The computing device 200 performs the operation of the present invention through executing a program by at least one processor. The computing device 200 generates a 2D/3D image by using the sampling data detected by the digitizer 190. At this time, the computing device 200 sets a detection window in time domain, separates data included in the detection window only from the sampling data, and generates the 2D/3D image using the data separated by the detection window. A method for the computing device 200 to generate an image will be described in detail with reference to FIG. 4.

With reference to FIG. 2, a time-gated detection will be described. The detection window ($t_\alpha$, $t_\beta$) is set in time domain and used to utilize only a voltage signal belonging to a specific time range among the sampled voltage signals. The detection window can be set manually, and an optimal detection window determined through an SNR optimization algorithm can be set automatically.

Referring to FIG. 2, since the time-gated detection separates only a necessary signal, the background signal is removed and a voltage signal with high SNR can be obtained. In order to perform time-gated detection as described above, it is required to set an appropriate detection window. However, since a general multi-photon microscope uses an optical pulse train having a high repetition rate (e.g., 76 MHz), it is difficult to separate signals with the detection window. On the other hand, the multi-photon microscope 10 of the present invention lowers the repetition rate of the pulsed laser 100 from 76 MHz to 4 MHz via the repetition rate tuner 110 to secure a sufficient time interval between optical pulses. Thus, the time-gated detection can be performed.

Hereinafter, the effect obtained by lowering the repetition rate of the pulsed laser 100 in the multi-photon microscope will be described.

The output power (Po) of the pulsed laser 100 is related to a peak power and the repetition rate of a pulse, and defined as in Equation 1. In equation 1, $P_{peak}$ is the peak power of the pulse, $\tau_p$ is a pulse length, and $f_p$ is the repetition rate of the pulse.

$$P_o = P_{peak} \tau_p f_p \qquad \text{Equation 1}$$

Photon absorption efficiency for the peak power of a pulse in a two-photon microscope can be defined as in Equation 2. In Equation 2, $N_a$ is the number of absorbed photons per fluorophore per pulse through two-photon excitation in a sample, and is proportional to the square of the peak power of the pulse. $\delta$ is a photon absorption cross section, and S is a simple expression of various constants and variables (wavelength, Planck's constant, speed of light, numerical aperture).

$$N_a = (P_{peak})^2 \tau_p \delta S \qquad \text{Equation 2}$$

A power of light irradiated to the sample 20 is limited to a certain value or less in consideration of sample damage. Therefore, referring to Equation 1, the peak power that can be irradiated to the sample varies depending on the repetition rate. That is, the two-photon microscope 10 using a repetition rate of 4 MHz can irradiate a pulse having a larger peak power ($P_{peak}$) than when using a repetition rate of 76 MHz while maintaining a limited output power (Po). Therefore, referring to Equation 2, the two-photon microscope 10 can increase the photon absorption efficiency compared to when using the repetition rate of 76 MHz. For reference, in the case of a three-photon microscope, $N_a$ in Equation 2 is proportional to the cube of $P_{peak}$.

In addition, if a multi-photon microscope 10 using the repetition rate of 4 MHz maintains the same peak power ($P_{peak}$) to acquire a fluorescence signal of the same level as the repetition rate of 76 MHz, the output power (Po), which is proportional to the repetition rate, can be lowered. As a result, the output power of the pulsed laser 10 can be lowered by lowering the repetition rate of the pulsed laser, thereby being able to reduce the sample damage.

Figure 3A:
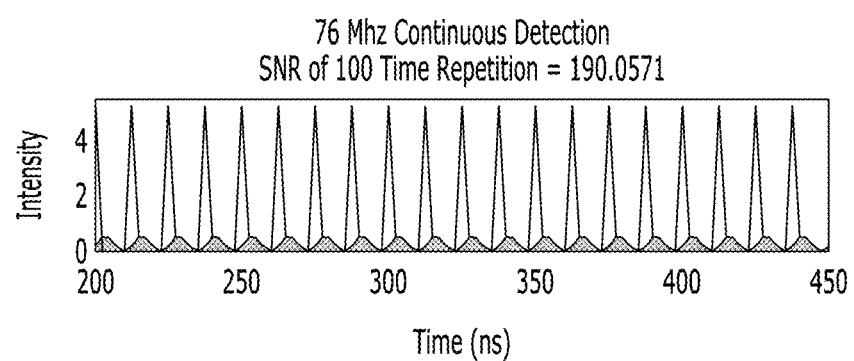
FIG. 3A, FIG. 3B, and FIG. 3C are simulation results obtained through applying a repetition rate tuning and a time-gated detection according to an embodiment.
Figure 3B:
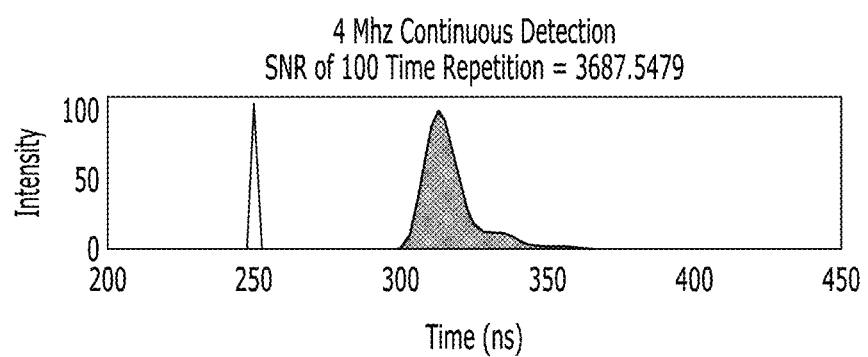
Figure 3C:
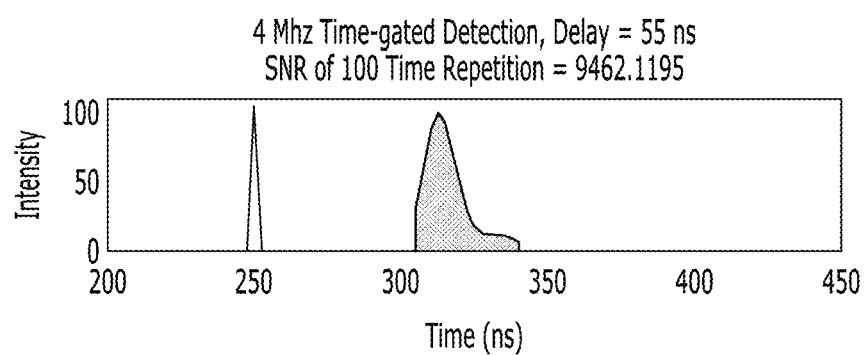

FIG. 3A, FIG. 3B, and FIG. 3C are simulation results obtained through applying a repetition rate tuning and a time-gated detection according to an embodiment.

Referring to FIG. 3A to FIG. 3C, these are shows results obtained through simulating fluorescence signals emitted from a fluorescent material excited with an excitation signal and calculating SNRs by detecting the fluorescence signals. In the simulation, the fluorescence signal by multi-photon excitation is set to have a lifetime of 10 ns and the background signal is added as a noise. In the simulation, the same output power was assumed, and a peak pulse difference of excitation signals and a power difference of emission signals depending on a repetition rate difference are reflected. The test was repeated 100 times each, and the SNR was obtained by calculating a ratio of an average of the sum of the acquired signals and a standard deviation of the sum of the background signals for 100 repetitions.

FIG. 3A is a simulation result of a case where the excitation signal is a 76 MHz optical pulse train and the fluorescence signal is continuously detected. FIG. 3B is a simulation result of a case where the excitation signal is a 4 MHz optical pulse train and the fluorescence signal is continuously detected. FIG. 3C is a simulation result of a case where the excitation signal is a 4 MHz optical pulse train and a time-gated detection is performed on the fluorescence signal within a detection window.

As a result of the simulations, the SNR of FIG. 3A is 190.0571, the SNR of FIG. 3B is 3687.5479, and the SNR of FIG. 3C is 9462.1195. According to the simulation result, as shown in FIG. 3C, it can be seen that the SNR of the signal can be greatly improved when the repetition rate is lowered and the time-gated detection is applied.

Referring to FIG. 3A, it can be seen that performing the time-gated detection is not available due to the difficulty in separating the signals using the detection window when the repetition rate is high. In addition, comparing FIG. 3A and FIG. 3C, it can be seen that the peak values of the excitation signal and the emission signal diminishes when the repetition rate is high.

Figure 4:
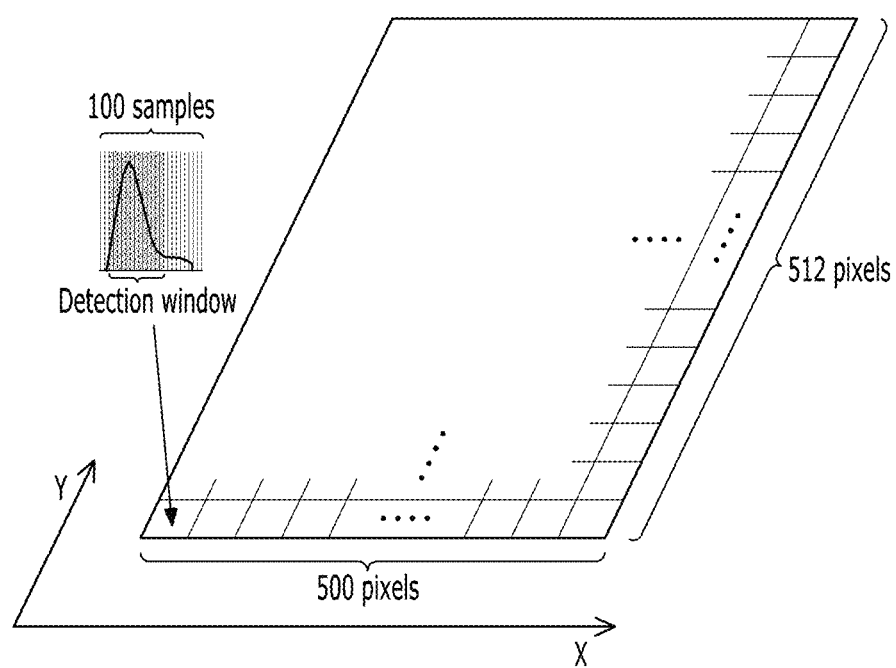
FIG. 4 is a diagram illustrating an imaging method of a computing device according to an embodiment.

FIG. 4 is a diagram illustrating an imaging method of a computing device according to an embodiment.

Referring to FIG. 4, a computing device 200 generates a 2D/3D image from data sampled by the digitizer 190. Here, the generation of the 2D image will be described as an example.

It is assumed that the digitizer 190 detects, for example, 400 M samples per second.

It is assumed that scanner 130 can repeat scans 4K times per second on the X-axis. During the time (¼K second) while the scanner 130 goes back to an original position after one time X-axis scan, the digitizer 190 can detect 100K samples (400 M/4K second).

Since the pulse repetition rate is 4 MHz, the digitizer 190 can detect 100 samples during the time (¼M second) while one pulse occurs. That is, the digitizer 190 can sample one pulse signal as 100 data. The computing device 200 generates one pixel constituting an image based on 100 samples. In this case, one pixel constituting the image is generated using only a specific number of samples within the detection window of 100 samples.

If the X-axis unidirectional scan is used, 50K samples are detected during ¼K second. Since it is set as one pixel constituting an image is generated from 100 samples, the X-axis of the image can be composed of 500 pixels using 50K samples acquired from X-axis unidirectional scan. Similarly, the Y-axis of the image can be composed of 512 pixels.

If the computing device 200 completes one image while the scanner 130 scans X-axis 512 times along the Y-axis at a speed of 4 KHz (¼K*512 second), 7.8 images are generated per second.

As described above, the computing device 200 can generate an image from the signal detected and sampled by the digitizer, based on the pulse repetition rate (4 MHz) changed by the repetition rate tuner 110, the sampling information (400 M sampling per second) of the digitizer 190, and the scanning information of the scanner 130.

Figure 5:
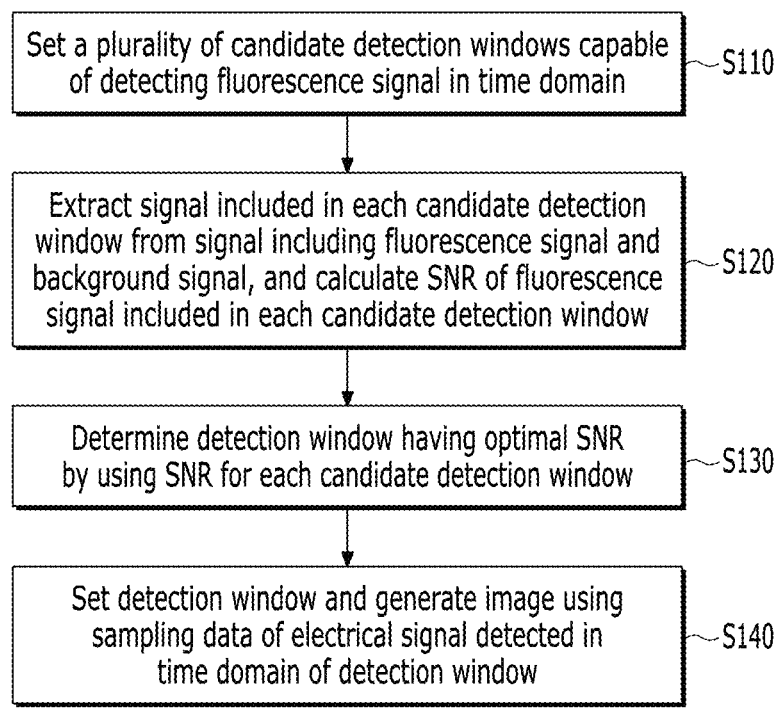
FIG. 5 is a flowchart showing a method of setting a detection window for time-gated detection according to an embodiment.

FIG. 5 is a flowchart showing a method for setting a detection window for time-gated detection according to an embodiment.

Referring to FIG. 5, a computing device 200 sets a detection window ($t_\alpha$, $t_\beta$) in time domain for time-gated detection, and uses only sampling data separated by the detection window. Though the user can manually set the detection window of an arbitrary section, it is difficult to set the detection window for an optimal SNR. Therefore, it is required to automatically set the optimal detection window through an SNR optimization algorithm. The SNR optimization algorithm may be various, and an automated single frame optimization algorithm may be used.

The computing device 200 sets a plurality of candidate detection windows ($t_{\alpha\_candidate}$, $t_{\beta\_candidate}$) capable of detecting a fluorescence signal in time domain (S110). A start time, an end time, and a window size of the candidate detection window may be set variously.

The computing device 200 extracts a signal included in each candidate detection window from a signal including the fluorescence signal and a background signal, and calculates an SNR of the fluorescence signal included in each candidate detection window (S120). The computing device 200 may calculate the SNR of each candidate detection window by using a signal within each candidate detection window among signals sampled by the digitizer 190 (sampling data). The computing device 200 extracts the fluorescence signal and the background signal from the candidate detection window, and calculates the SNR using the extracted fluorescence signal and background signal. The SNR may be calculated, for example, by dividing the average signal intensity of 100 pulses by a standard deviation.

The computing device 200 determines a detection window ($t_\alpha$, $t_\beta$) having an optimal SNR by using the SNR for each candidate detection window (S130).

The computing device 200 sets the detection window ($t_\alpha$, $t_\beta$) and generates an image using sampling data of an electrical signal detected in time domain of the detection window (S140). The computing device 200 may generate an image using only samples detected in the detection window, instead of using the entire samples output from the digitizer 190.

According to another embodiment, a computing device 200 may set the digitizer 190 to sample in a time interval corresponding to the candidate detection window, then receive sampling data detected in the candidate detection window from a digitizer 190. The computing device 200 can calculate a fluorescence signal in the corresponding candidate detection window by using the sampling data. The computing device 200 can determine an optimal candidate detection window as the detection window by comparing the fluorescence signals corresponding to the candidate detection windows.

Figure 6:
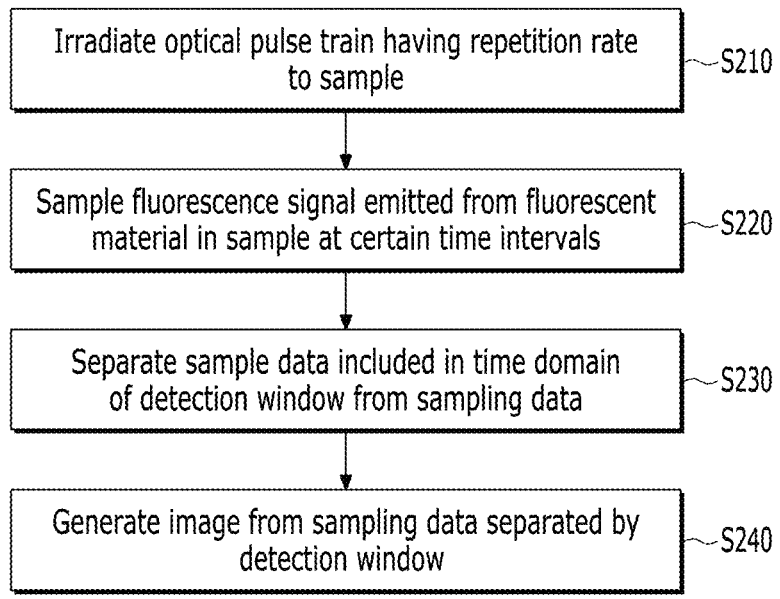
FIG. 6 is a flowchart showing a time-gated detection-based imaging method according to an embodiment.

FIG. 6 is a flowchart showing a time-gated detection-based imaging method according to an embodiment.

Referring to FIG. 6, a multi-photon microscope 10 irradiates an optical pulse train having a repetition rate (e.g., 4 MHz) to a sample 20 (S210). The repetition rate of the optical pulse train may be varied by a pulsed laser or by a separate repetition rate tuner 110 such as a pulse picker. The repetition rate of the optical pulse train irradiated to the sample 20 is set to a level enabling a time-gated detection.

The multi-photon microscope 10 samples a fluorescence signal emitted from a fluorescent material in the sample 20 at certain time intervals (S220). The multi-photon microscope 10 can convert a light emitted from the fluorescent material into a voltage signal and can sample the voltage signal through a photodetector 170, an amplifier 180, and a digitizer 190 shown in FIG. 1.

The multi-photon microscope 10 separates sample data included in time domain of the detection window from the sampling data (samples) (S230). The multi-photon microscope 10 can find a detection window for an optimal SNR through an optimization algorithm such as automated single frame optimization algorithm.

The multi-photon microscope 10 generates an image from the sampling data separated by the detection window (S240). The multi-photon microscope 10 can generate images from the sampling data based on a pulse repetition rate, sampling information, and scanning information.

Figure 7:
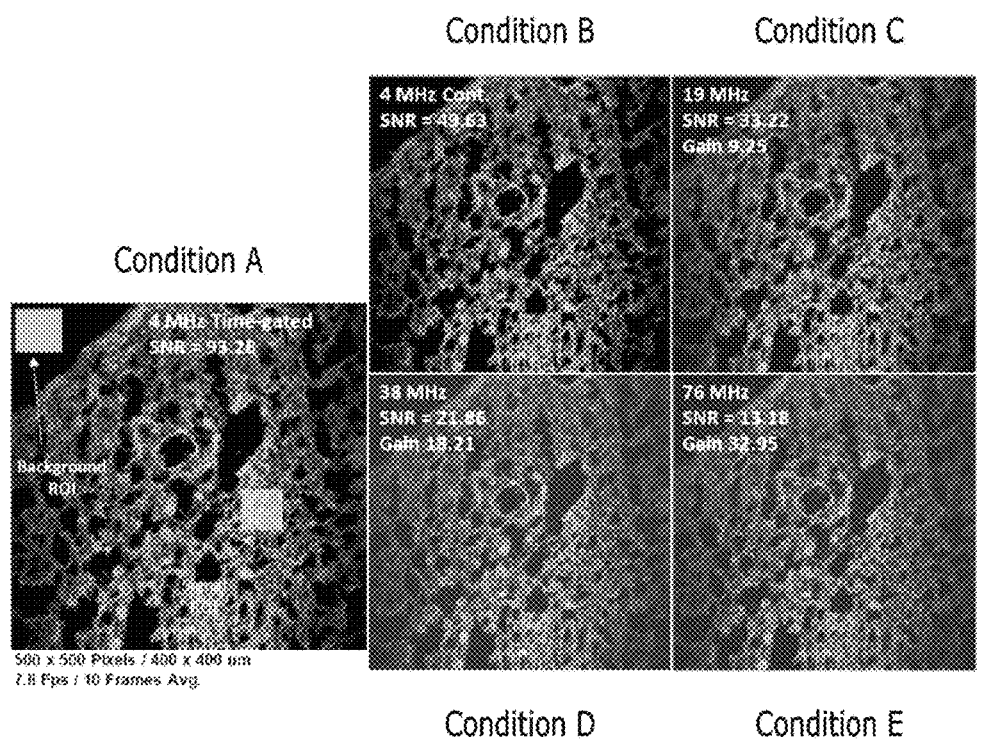
FIG. 7 is a drawing comparing imaging results of a two-photon microscope according to an embodiment.

FIG. 7 is a diagram comparing imaging results of a multi-photon microscope according to an embodiment.

Referring to FIG. 7, a multi-photon microscope 10 lowers a high repetition rate (e.g., 76 MHz) of a pulsed laser 100 to a repetition rate (e.g., 4 MHz) enabling time-gated detection by using a repetition rate tuner 100 such as a pulse picker, and performs imaging by sampling a fluorescence signal separated in the detection window. When a tissue is imaged using a low repetition rate (4 MHz), image quality improvement can be observed because an SNR is higher than when imaging using a high repetition rate (76 MHz) at the same average power. When time gating is performed using the same repetition rate (4 MHz), it can be observed that the SNR further increases and the image quality is improved. Therefore, the multi-photon microscope 10 can improve the image quality with time-gated detection, and the results of comparative experiments with conventional art can be found in FIG. 7.

FIG. 7 shows imaging results of a mouse lung tissue under five conditions described in Table 1. The five conditions are combinations of repetition rates and whether to use time-gated detection. SNR is a result value of dividing an intensity average of a signal region by a standard deviation of a background region after designating an ROI of the signal region and an ROI of the background region in images generated under each condition.

TABLE 1

| Condition | Repetition rate | Detection | SNR |
| --- | --- | --- | --- |
| A | 4 MHz | Time-Gated | 93.28 |
| B | 4 MHz | Continuous | 49.63 |
| C | 19 MHz | Continuous | 33.22 |
| D | 38 MHz | Continuous | 21.86 |
| D | 76 MHz | Continuous | 13.18 |

Condition A image is an imaging result of the present invention, and has about seven times improved SNR compared to Condition E image obtained from continuous detection at 76 MHz. From the comparison of the SNRs of Condition B to Condition E, it can be seen that the repetition rate and the SNR have an inversely proportional relationship.

The time-gated detection-based imaging method described so far can be applied to various types of multi-photon microscopes. Hereinafter, an additional embodiment of the multi-photon microscope will be described.

FIG. 8 to FIG. 11 are configuration diagrams of various multi-photon microscopes implementing a time-gated detection-based imaging method.

Referring to FIG. 8 to FIG. 11, a digitizer 190 and a computing device 200 may be applied to various multiphoton microscopes 11, 12, 13, and 14 including a repetition rate tuner 110. Various multi-photon microscopes 11, 12, 13, and 14 can perform sampling based on repetition rate tuning and time-gated detection.

Figure 8:
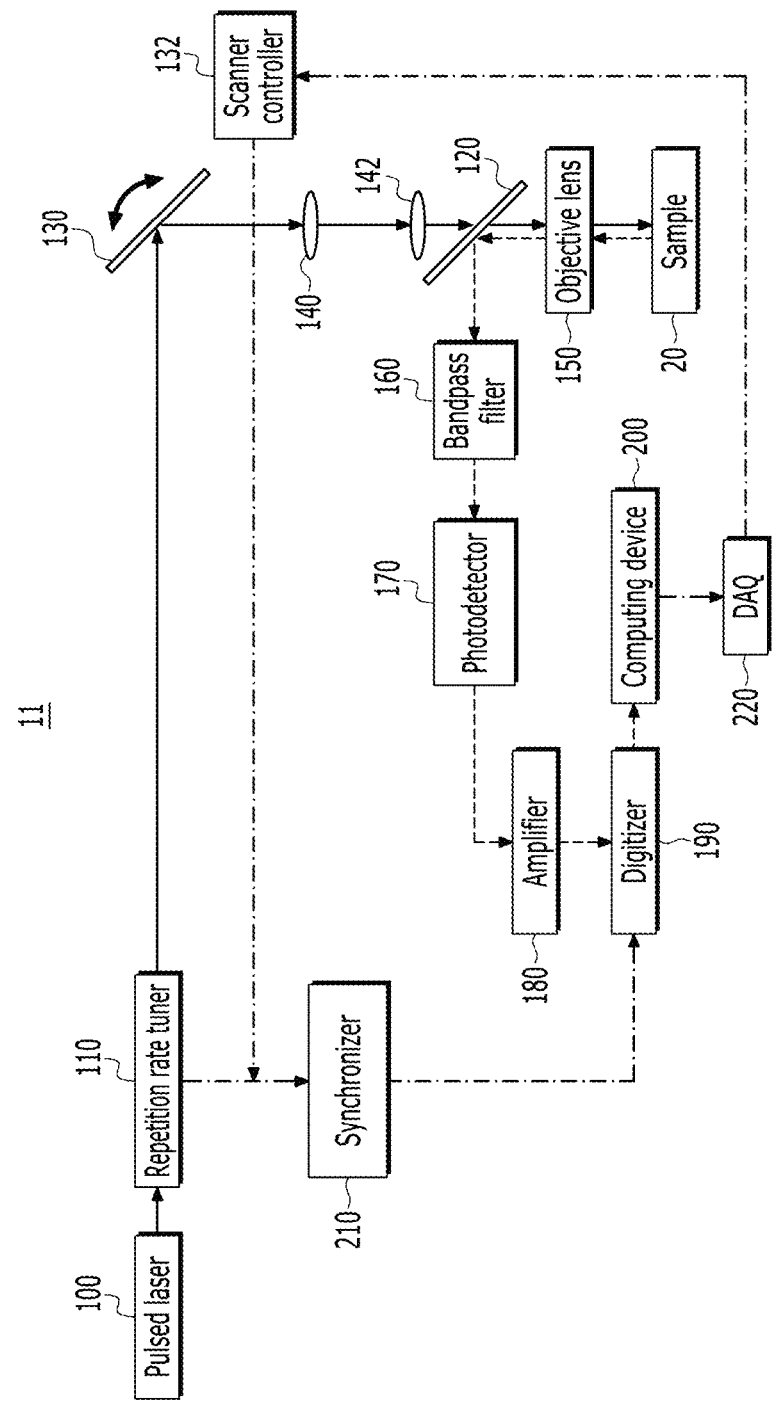
FIG. 8 to FIG. 11 are configuration diagrams of various multi-photon microscopes implementing a time-gated detection-based imaging method.

First, referring to FIG. 8, a digitizer 190 and a computing device 200 constitute the same excitation signal path as the multi-photon microscope 10, but may be included in the multi-photon microscope 11 constituting an emission signal path different from that of the multi-photon microscope 10. The multi-photon microscope 11 can be referred to as a Non de-scanning multi-photon microscope because a fluorescence signal does not pass through a scanner 130.

The multi-photon microscope 11 may include a pulsed laser 100, a repetition rate tuner 110, the scanner 130, a scanner controller 132, scan lenses 140 and 142, an objective lens 150, a bandpass filter 160, a photodetector 170, an amplifier 180, the digitizer 190, and the computing device 200. Further, in the multi-photon microscope 11, a dichroic mirror 120 is located between the objective lens 150 and the scan lens 142, and the path of the fluorescence signal is changed by the dichroic mirror 120. The fluorescence signal emitted from a sample 20 is not transmitted through a de-scanning path including the scan lenses 142 and 140, and the scanner 130. Instead, the fluorescence signal entering the objective lens 150 is reflected by the dichroic mirror 120, passes through the band filter 160 and the photodetector 170, and then is converted into a voltage signal by the amplifier 180.

The digitizer 190 detects a voltage signal of the fluorescence signal through sampling.

The computing device 200 generates a 2D/3D image from a signal sampled and detected by the digitizer 190.

Since there is a difference between an excitation wavelength and an emission wavelength of a fluorescent material, it is difficult to set up a suitable lens for all wavelengths in practice. However, in the multi-photon microscope 11, the fluorescence signal does not pass the scan lenses 140 and 142 again, thereby reducing a loss due to lens transmission. Therefore, the multi-photon microscope 11 can acquire a signal with a high SNR, thereby improving the imaging quality.

Figure 9:
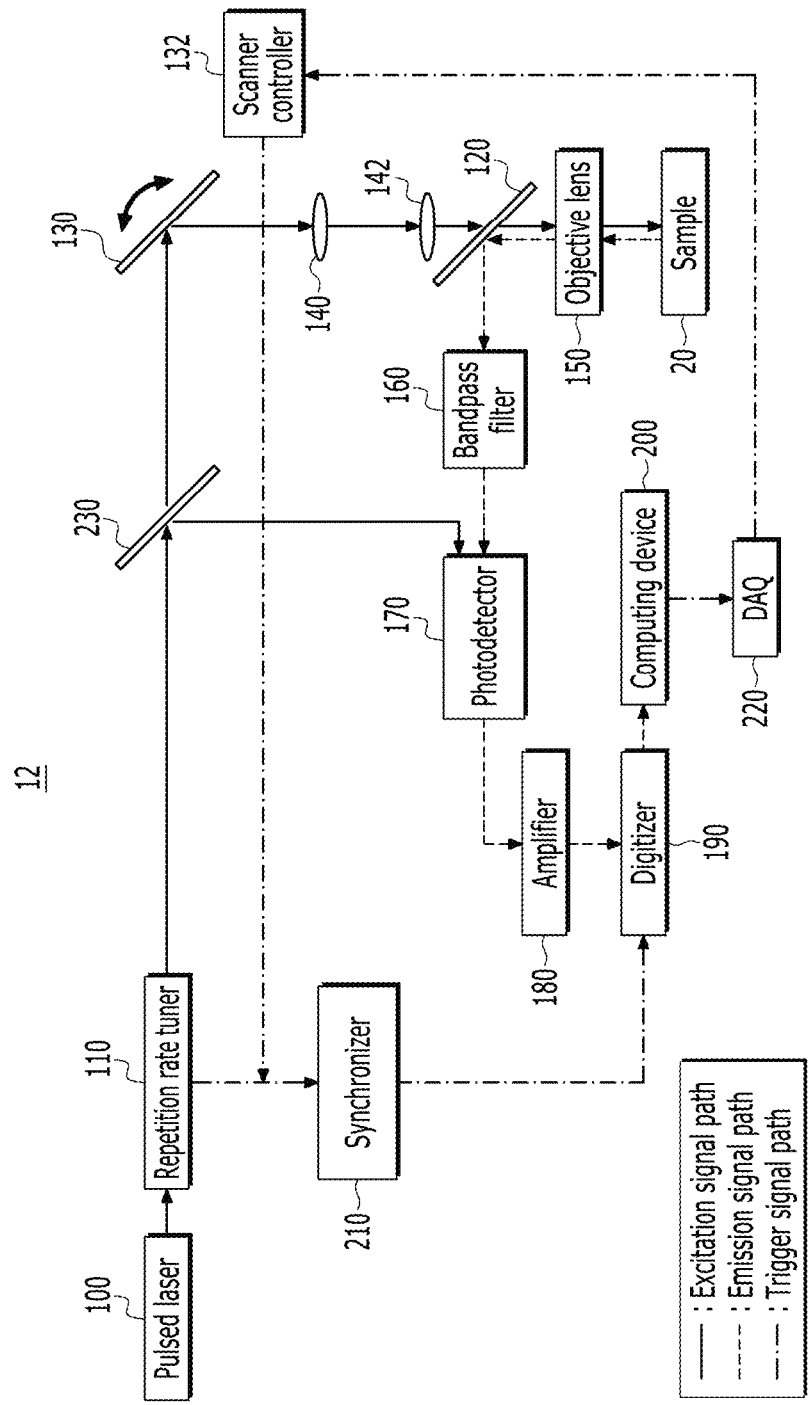

Referring to FIG. 9, a digitizer 190 and a computing device 200 may be included in a multi-photon microscope 12 which is referred to as a fluorescence lifetime imaging microscopy (FLIM).

The multi-photon microscope 12 constitutes the same excitation signal path and emission signal path as the multi-photon microscope 11. However, a photodetector 170 calculates a fluorescence lifetime of a sample by measuring an instrument response function (IRF) of a pulsed laser 100, and then the calculated fluorescence lifetime is used for imaging.

The multi-photon microscope 12 may further include a beam splitter 230 that splits an optical signal output from a repetition rate tuner 110 and transmits the split signal to the photodetector 170.

Figure 10:
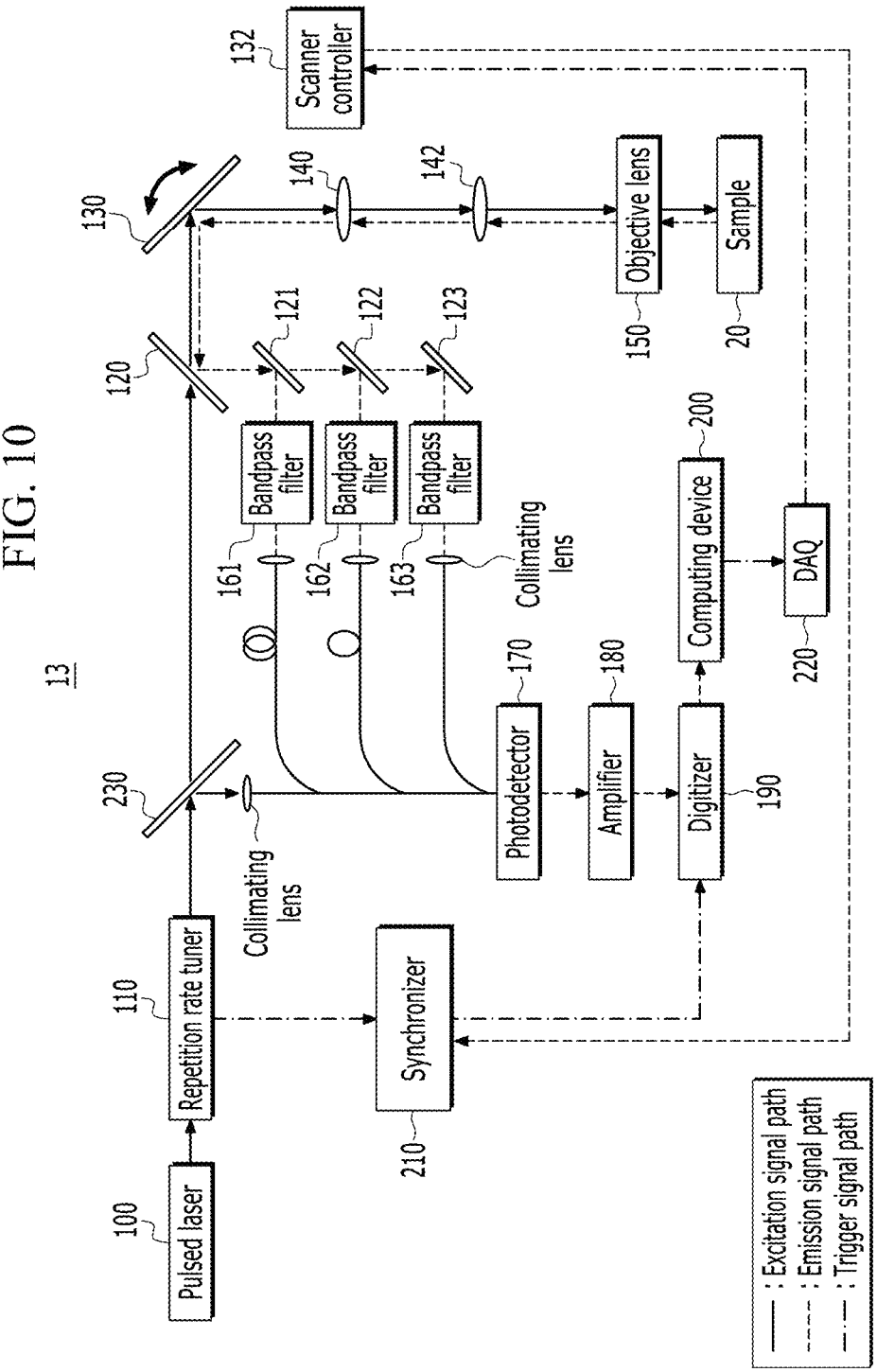

Referring to FIG. 10, a digitizer 190 and a computing device 200 may be included in a multi-photon microscope 13 that measures fluorescence signals of multiple wavelengths. The multi-photon microscope 13 can be referred to as a two-photon microscopy (TPM), a second harmonic generation (SHG), and a multimodal microscopy detecting a confocal reflectance signal.

In the multi-photon microscope 13, the fluorescence signal is reflected by a dichroic mirror as in the multi-photon microscope 10. The fluorescence signal reflected from the dichroic mirror 120 is spitted by wavelength-specific dichroic mirrors 121, 122, and 123, and then transmitted to the photodetector 170 via wavelength-specific bandpass filters 161, 162, and 163. A current signal output from the photodetector 170 is converted into a voltage signal by an amplifier 180, and then transmitted to the digitizer 190. At this time, the wavelength-specific bandpass filters 161, 162, and 163 and the photodetector 170 are connected via an optical fiber, and the signal of each wavelength is input to the photodetector 170 at different times by adjusting the length of each optical fiber. As a result, multiple fluorescence signals can be converted into current with one photodetector 170.

Accordingly, the multi-photon microscope 13 can detect a fluorescence signal of multimodality with a single photodetector 170 regardless of the number of modalities. Like the multi-photon microscope 12, the multi-photon microscope 13 further includes a beam splitter 230, thereby being able to acquire an FLIM signal additionally.

Figure 11:
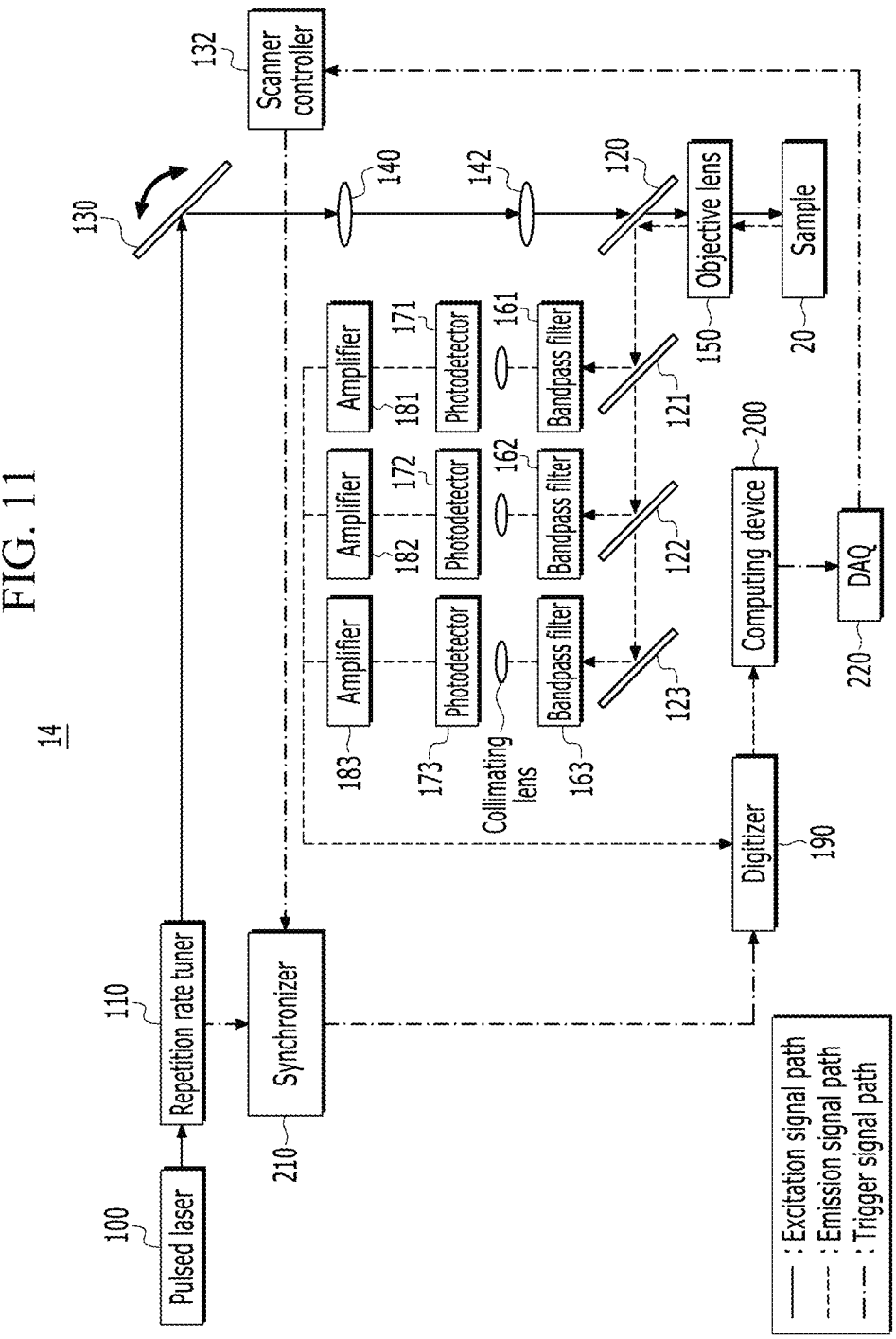

Referring to FIG. 11, a multi-photon microscope 14 may include a digitizer 190 and a computing device 200. In the multi-photon microscope 14, a dichroic mirror 120 is located between an objective lens 150 and a scan lens 142, and a path of a fluorescence signal is changed at the dichroic mirror 120 as in the multi-photon microscope 11.

And, the fluorescence signal reflected from the dichroic mirror 120 is divided by wavelength-specific dichroic mirrors 121, 122, and 123, passes through wavelength-specific photodetectors 171, 172, and 173 and amplifiers 181, 182, and 183, and then is transmitted to the digitizer 190.

As described above, the time-gated detection-based imaging method of the present invention can be applied to various types of multiphoton microscopes using a pulsed laser, regardless of the structure or the number of modalities of the multi-photon microscopes. For example, the time-gated detection-based imaging method of the present invention can be applied to an imaging system that acquires second harmonic generation, a fluorescence lifetime imaging system, a coherent anti-stokes Raman spectroscopy, and the like.

In addition, the time-gated detection-based imaging method of the present invention can restore a three-dimensional structure of a sample through optical sectioning. Further, since an optical sectioning image is directly acquired from a tissue, the time-gated detection-based imaging method of the present invention can be applied as an optical biopsy of pathology and also applied to in-vivo imaging such as catheter imaging and endoscopic imaging which is used for preclinical and clinical researches.

The embodiments of the present invention described above are not implemented only through an apparatus and a method, but may be implemented through a program for realizing a function corresponding to the configuration of the examples of the present invention or a recording medium on which the program is recorded.

While this invention has been described in connection with what is presently considered to be various embodiments, it is to be understood that the invention is not limited to the disclosed embodiments. On the contrary, it is intended to cover various modifications and equivalent arrangements included within the spirit and scope of the appended claims.

What is claimed is:

1. A multi-photon microscope exciting a fluorescent material in a sample using multi-photon excitation, the multi-photon microscope comprising:
    a repetition rate tuner that lowers an optical pulse train emitted from a pulsed laser to a repetition rate for time-gated detection;
    a scanner that scans the optical pulse train transmitted from the repetition rate tuner in x-axis and y-axis directions;
    an objective lens that irradiates an optical signal scanned by the scanner to the sample and acquires a fluorescence signal emitted from the excited fluorescent material;
    a photodetector that photoelectrically converts the fluorescence signal acquired by the objective lens;
    an amplifier that converts a current signal output from the photodetector into a voltage signal;
    a digitizer that samples the voltage signal output from the amplifier; and
    a computing device that separates sampling data output from the digitizer with a detection window set in time domain, and generates an image using the sampling data separated by the detection window based on the repetition rate set by the repetition rate tuner, sampling information of the digitizer, and scanning information of the scanner.

2. The multi-photon microscope of claim 1, wherein the repetition rate tuner is a pulse picker or a cavity dumper.

3. The multi-photon microscope of claim 1, wherein the computing device sets a plurality of candidate detection windows in time domain, compares signal to noise ratios (SNRs) of fluorescence signals measured by each of the candidate detection windows, and determines the detection window.

4. The multi-photon microscope of claim 1, wherein the photodetector receives the fluorescence signal reflected by a dichroic mirror located between the repetition rate tuner and the scanner, or the fluorescence signal reflected by a dichroic mirror located between the objective lens and the scanner.

5. The multi-photon microscope of claim 1, wherein the photodetector receives fluorescence signals of different wavelengths separated by wavelength at different times.

6. The multi-photon microscope of claim 1, wherein the photodetector and the amplifier are constructed wavelength-specifically for the fluorescence signal.

7. The multi-photon microscope of claim 1, wherein the computing device:
    determines a number of first samples for generating a pixel from the sampling data based on the repetition rate, the sampling information, and the scanning information;
    selects second samples within the detection window set from among the first samples, as the sampling data separated by the detection window; and
    generates the image based on the pixel generated by the second samples.

8. An operation method of a multi-photon microscope exciting a fluorescent material in a sample using multi-photon excitation, the operation method comprising:
    lowering an optical pulse train emitted from a pulsed laser to a repetition rate for time-gated detection;
    scanning the optical pulse train lowered to the repetition rate in x-axis and y-axis directions;
    irradiating the scanned optical pulse train to the sample;
    generating sampling data by detecting a fluorescence signal emitted from the fluorescent material in the sample at specific time intervals;
    separating a signal using a detection window set in time domain from the sampling data; and
    generating an image using the sampling data separated by the detection window based on the repetition rate, sampling information used to generate the sampling data, and scanning information used to scan the optical pulse train.

9. The operation method of claim 8, further comprising setting a plurality of candidate detection windows in time domain, comparing SNRs of fluorescence signals measured by each of the candidate detection windows, and determining a candidate detection window having an optimal SNR among the plurality of the candidate detection windows as the detection window.

10. The operation method of claim 8, wherein generating the image comprises:
    determining a number of first samples for generating a pixel from the sampling data based on the repetition rate, the sampling information, and the scanning information,
    selecting second samples within the detection window set from among the first samples, as the sampling data separated by the detection window, and generating the image based on the pixel generated by the second samples.

\* \* \* \* \*